United States Patent [19]

Wess

[11] 4,172,286
[45] Oct. 23, 1979

[54] SYSTEM FOR THE GENERATION OF SINE OSCILLATIONS

[75] Inventor: Günter Wess, Seefeld, Fed. Rep. of Germany

[73] Assignee: Siemens Aktiengesellschaft, Berlin & Munich, Fed. Rep. of Germany

[21] Appl. No.: 863,517

[22] Filed: Dec. 22, 1977

[30] Foreign Application Priority Data

Jan. 18, 1977 [DE] Fed. Rep. of Germany ....... 2701859

[51] Int. Cl.$^2$ ............................................. G06F 15/34
[52] U.S. Cl. ..................................... 364/721; 328/14; 328/145; 364/722
[58] Field of Search ................... 364/721, 722; 328/14, 328/14.5; 331/177 R

[56] References Cited

U.S. PATENT DOCUMENTS

| | | | |
|---|---|---|---|
| 3,585,509 | 6/1971 | Davis et al. | 328/145 |
| 3,605,035 | 9/1971 | Rocheleau | 331/177 R X |
| 3,633,017 | 1/1972 | Crooke et al. | 364/721 |
| 3,739,374 | 6/1973 | Kiowski | 364/721 X |
| 4,042,973 | 8/1977 | Caulfield et al. | 364/722 |

FOREIGN PATENT DOCUMENTS 1404769  9/1975  United Kingdom ..................... 364/721

Primary Examiner—Jerry Smith
Attorney, Agent, or Firm—Hill, Van Santen, Steadman, Chiara & Simpson

[57] ABSTRACT

A system for the direct synthesis of sine oscillations by means of a sine table which has a digital counter as its input. The output of the counter is also coupled to a logarithm device and from there to a digital analog converter. The converter is coupled to a controlled pulse generator which feeds the counter with a frequency which varies logarithmically with time.

4 Claims, 2 Drawing Figures

4,172,286

SYSTEM FOR THE GENERATION OF SINE OSCILLATIONS

BACKGROUND OF THE INVENTION

1. Field of the Invention

The field of art to which this invention pertains is devices for the synthesis of sine oscillations and in particular to a digital sine generator having a wobbled frequency output.

2. Description of the Prior Art

Sine generators have been used to produce sine signals in the LF range using the heterodyne principle or employing storage properties of capacitors in order to produce a specific frequency.

Another technique has been to use the PCM method in which, at fixed intervals of time, the desired signal value is fed in digital form to a digital analog converter which produces the desired signal after suitable filtering to suppress the "folded" frequencies.

SUMMARY OF THE INVENTION

It is an important feature of the present invention to provide an improved system for the generation of sine signals having a wobbled frequency.

It is an important object of the invention to provide a sine generator using a sine table which has fed thereto the outputs of a digital counter which, in turn, is operated by a controlled pulse generator.

It is another object of the invention to provide a sine generator as described above wherein the digital counter outputs are also coupled to a digital logarithm device and output thereof is coupled to a digital analog converter.

It is also an object of the invention to provide a sine generator as described above wherein an output of the digital analog converter is coupled to a control input of the pulse generator to provide logarithmic variable frequency at the output thereof.

It is a further object of the invention to couple an output of the digital analog converter to an electron beam tube for display purposes.

These and other objects, features and advantages of the invention will be understood from the following description and associated drawings wherein reference numerals are used to designate a preferred embodiment.

DESCRIPTION OF THE PREFERRED EMBODIMENT

This invention relates to a system for the direct synthesis of sine oscillations in the LF-range by means of an operable sine table, and in particular, relates to a digital sine generator having a wobbled frequency output.

In sine generators using the PCM method, adequate filtering is achieved if the sampling frequency is at least four times the maximum signal frequency to be produced. A simple process for the calculation of the instantaneous values of a sine voltage employs a fixed value store which for discrete phase values contains the associated amplitude values (Computer Design, July 1975, Page 100).

The phase values are calculated by repeated addition of a constant. Following each pulse train period T (1/T=pulse train frequency), the phase is increased by a constant value K. The instantaneous values for a sine voltage are obtained in accordance with the equation $u(t) = U \sin \omega t$, where the frequency $\omega$ of this voltage is directly proportional to the constant K.

An advantage of this principle consists in that employing a pulse generator of fixed frequency and a fixed low-pass filter it is possible to produce sine voltages of any desired frequency of less than one quarter of the pulse train frequency, where the frequency stability is governed by the pulse generator. The spectral purity of the produced voltages is dependent upon the number of stored phase steps, the resolution of the digital/analog converter and the blocking attenuation of the low-pass filter. The number of possible frequencies is governed by the number of calculating stages which is generally greater than the number of numerical values in the sine table.

The invention utilizes a counter which is loaded by a pulse generator. The advantage is that a swept (varied) sine frequency is obtained in which the frequency values follow one another without phase displacements.

In accordance with the invention, the output voltage of the digital-analog converter is used to horizontally deflect the beam of an electron beam tube.

A further feature of the invention is that the output voltage of the digital-analog converter controls the controllable pulse generator in such manner that its frequencies depend exponentially upon these voltages, so that the sinusoidal voltage exhibits a frequency variation which is logarithmic in relation to time.

A preferred digital sine generator having a wobbled frequency consists of a sine table which possesses a plurality of PROMS, a digital counter which has its output coupled to the sine table, and its input coupled to a controllable pulse generator, a digital logarithm device, and a digital-analog converter. The digital-analog converter is connected at the output side of the digital logarithm device and serves to convert the logarithm of the frequency into a voltage.

Figure 1:
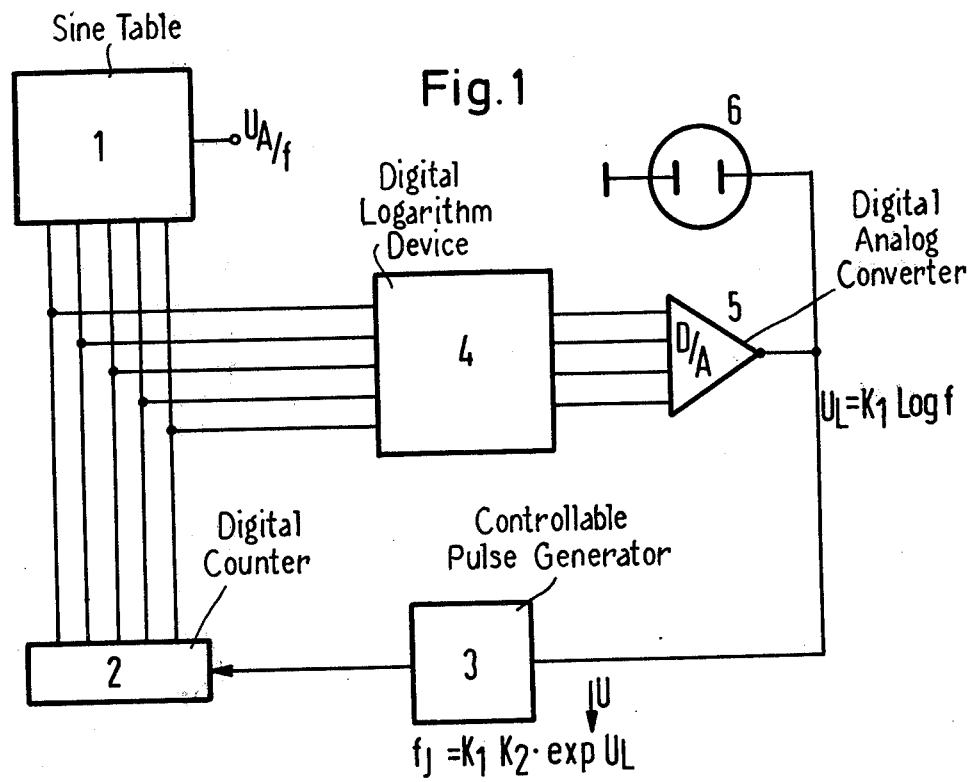
FIG. 1 is a schematic of a sine generator in accordance with the invention.

Referring to the drawings in greater detail, FIG. 1 illustrates a sine table 1 which, for example, may contain two PROMS having 64 amplitude values and 8-bit resolution. The frequency input into the sine table 1 is effected by the setting of the stages of a digital counter 2. The counter 2 is loaded by a controllable pulse generator 3. The frequency value is then converted in a simple logarithm device 4. Thereafter, the logarithm of the frequency is converted into a voltage by a digital-analog converter 5. This voltage serves to horizontally deflect the electron beam of the display tube 6, or in the place of the tube 6 a recorder may be employed. At the same time this voltage controls the controllable pulse generator 3 in such manner that the output frequency of that generator is exponentially variable. As the digital counter 2 is loaded by the pulse generator 3, the sine voltage has a frequency spectrum which is logarithmic with time.

Figure 2:
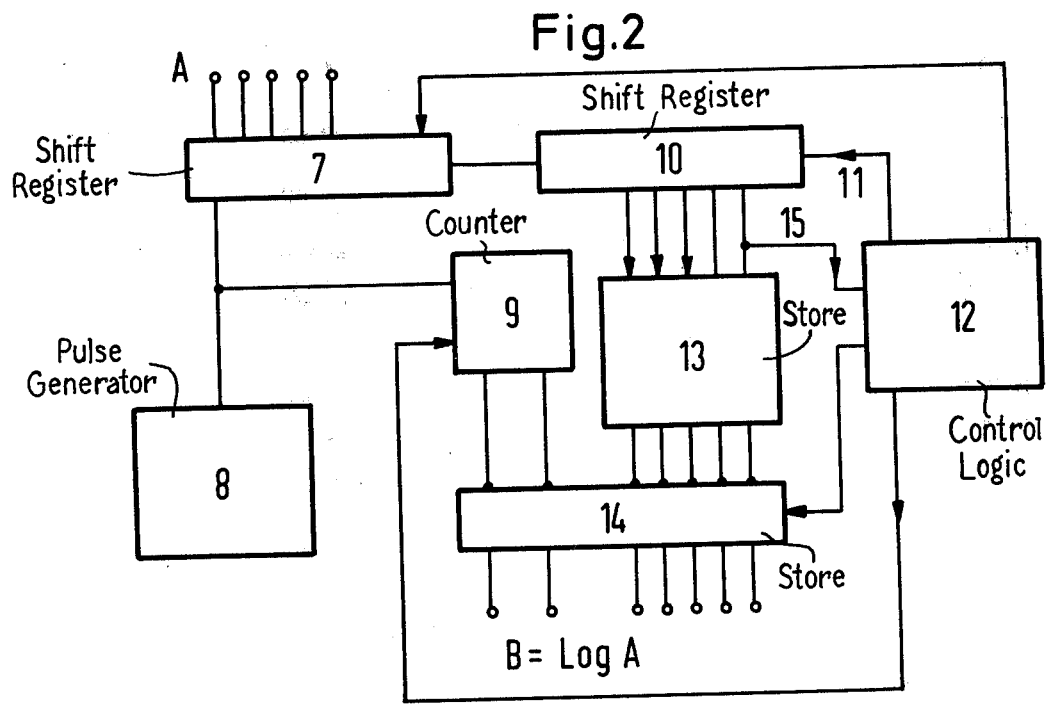
FIG. 2 is a circuit diagram of a suitable digital logarithm device employable in the system of FIG. 1.

FIG. 2 schematically illustrates a suitable digital logarithm device for binary numbers. A shift register 7 has, at its input, an applied binary number A. Pulses from a pulse generator 8 read out the binary number into a shift register 10 until a logic 1 appears at its output 15.

The counter 9 counts downwards from a predetermined number which is determined by the number of positions of the shift registers 7 and 10. At its output, at the end of the cycle, there exists the number of octaves of the binary number which corresponds to the numbers preceding the decimal point in the decimal logarithm. The remaining outputs of the shift register 10 are converted by a fixed word store 13, for example, a ROM, into the associated values of the logarithm. Thus the value number B=log A is present at the output B at the end of the cycle.

The control logic 12 ensures that the output values of the store 13 and of the counter 9 are transferred into the store 14 at the correct instant, that the shift register 7 assumes the number A at the correct instant, and that finally the counter 9 is set.

The function of the digital logarithm device 4 and/or the counter 2 and/or the controllable pulse generator 3 can also be carried out by a correspondingly programmed microprocessor.

I claim:

1. A system for the direct synthesis of sinusoidal oscillations comprising:
   an operable sine table,
   a digital counter having outputs coupled to related inputs of said sine table,
   a controllable pulse generator for setting/loading said digital counter,
   a digital logarithm device,
   the outputs of said digital counter being coupled to inputs of said digital logarithm device,
   a digital analog converter,
   means coupling the outputs of said digital logarithm device to respective inputs of said digital analog converter, and
   means utilizing the output of said digital analog converter.

2. A system in accordance with claim 1 wherein an electron beam display tube is provided and the output of said digital analog converter is coupled to said electron beam display tube.

3. A system in accordance with claim 1 wherein the controllable pulse generator has a control input and wherein the output of said digital analog converter is coupled to said control input, whereby the frequency of the pulse generator and hence of the sine table change logarithmically with time.

4. A system in accordance with claim 1 wherein said sine table has a plurality of PROMS for receiving the outputs of said digital counter and for developing a sine output therefrom.

* * * * *